United States Patent
Sadok et al.

(10) Patent No.: US 8,374,601 B2
(45) Date of Patent: Feb. 12, 2013

(54) CIRCULARLY POLARIZED ANTENNAS FOR A WIRELESS SENSOR SYSTEM

(75) Inventors: Mokhtar Sadok, Williston, VT (US); Michael A. Lynch, Shelburne, VT (US); Scott Thomas Fusare, Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 323 days.

(21) Appl. No.: 12/656,433

(22) Filed: Jan. 29, 2010

(65) Prior Publication Data

US 2011/0187504 A1   Aug. 4, 2011

(51) Int. Cl.
*H04W 4/00* (2009.01)
*H04W 40/00* (2009.01)
*H04B 7/00* (2006.01)
*H04M 1/00* (2006.01)

(52) U.S. Cl. ............. 455/431; 455/507; 455/554.1; 455/562.1; 455/447

(58) Field of Classification Search ............ 455/431, 455/507, 554.1, 555, 562.1
See application file for complete search history.

(56) References Cited

U.S. PATENT DOCUMENTS 8,145,208 B2 * 3/2012 Chari et al. ............. 455/431
2005/0221875 A1 * 10/2005 Grossman et al. ......... 455/575.7

* cited by examiner

*Primary Examiner* — Tilahun B Gesesse
(74) *Attorney, Agent, or Firm* — Edwards Wildman Palmer LLP; Scott D. Wofsy; Joshua L. Jones (57) ABSTRACT

A wireless sensor system for an aircraft including a central access point and a plurality of slave nodes arranged in a star network in which the central access point wirelessly exchanges data with the slave nodes in a bidirectional manner. At least one of the antenna at the central access point and the antenna of each of the slave nodes is circularly polarized.

6 Claims, 9 Drawing Sheets

CDF for Frequency Selective Data

CIRCULARLY POLARIZED ANTENNAS FOR A WIRELESS SENSOR SYSTEM

BACKGROUND OF THE INVENTION

1. Field of the Invention

The field of the present invention is directed to circularly-polarized antennas and, more particularly, circularly-polarized antennas for a wireless sensor system in an aircraft environment.

2. Description of the Related Art

The aircraft industry has been using copper wires and harnesses to connect sensors and systems since its origination. While there have been many improvements in all aspect of these assemblies, they remain costly, heavy and prone to failures. For instance, the Federal Aviation Administration has recently initiated efforts to standardize and anticipate wire defects to avoid catastrophic failures, reduce wire inspection costs, and improve fleet readiness.

Systems that use substantial sets of wires and harnesses are good candidates to benefit from wireless technology. For instance, some aircraft systems require inputs from a large number of sensors, harnesses, and junction boxes. Some of these sensors are located remotely from the data processors, and throughout the aircraft form tail rotor to cockpit, which require a harness of two dozen or more wires and can weigh twenty or more pounds. It would be beneficial if the aircraft would not have to carry these heavy harnesses. Some rough figures from the aerospace industry estimate a saving of $500 to $1000 can be achieved for each pound reduced off the aircraft weight. The use of wireless sensor technology is one way to reduce the added weight of wires on these aircraft.

Replacing wires with wireless technology is not a simple solution. Fading or the excessive attenuation of a wireless signal through a propagation medium, is a major issue in RF communications, particularly in an aircraft environment where there is often a lot of clutter and obstructing metal structures and equipment that can block or reflect wireless transmission. The presence of deep fading requires excess power margin to be budgeted in the link to mitigate 10-20 dB fading. However, budgeting excess margin increases power consumption, reduces effective range, and may not completely mitigate fading. Although traditional wireless systems employ antenna diversity techniques to mitigate fading, these techniques add cost, size, weight and complexity that is often not practical for wireless sensing systems. As part of improving the RF communications between nodes of the Wireless Sensor (WS) system, antenna polarization is given an important consideration. In particular, the inventors have found that circularly polarized antennas are better than linearly polarized antennas in many circumstances of interest. Depending on the nature of the wireless link, circular polarization can provide a substantial gain in the link budget and allow the WS and/or Access Point (AP) to be physically mounted on the aircraft without regard to matching the AP and WS linear polarized antenna orientation. To quantify the benefits of circular polarization for the WRS application, including superior propagation and penetration with less susceptibility to outside interference and multi-path signals, the inventors have performed several experiments in the laboratory and in the field, such as inside the aircraft fuselage, that show the advantages of circularly polarized antennas over linearly polarized antennas.

Circular polarization in the context of wireless transmission is linked to the polarization antenna which can be typically defined as a transducer that converts radio frequency electric current into electromagnetic waves that are then radiated into space and vice versa. The polarization type is defined by the electric field (i.e., E) plane that determines the orientation of the radio wave.

Figure 1A:
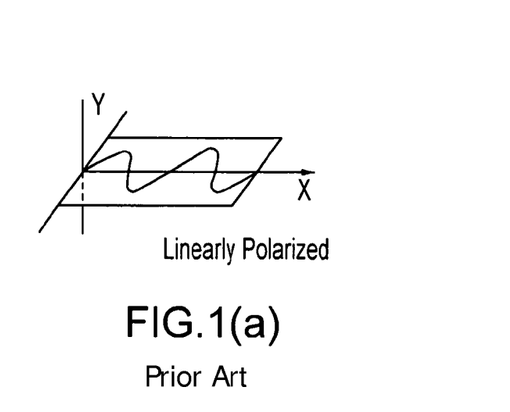
FIGS. 1(a) and 1(b) are graphical representations of linearly polarized waves.
Figure 1B:
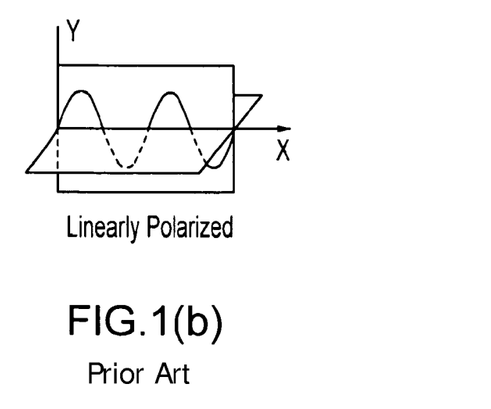
Figures 1C, 1D:
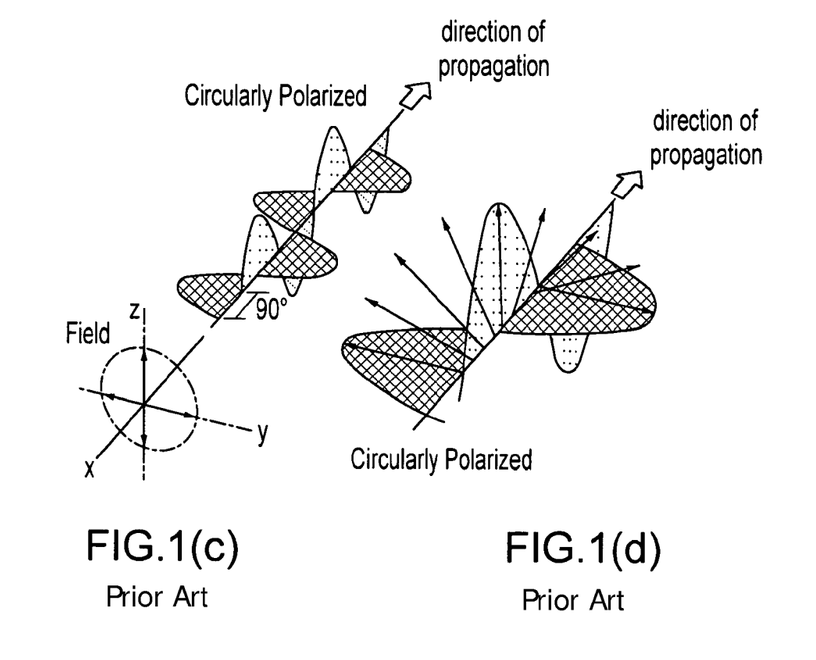
FIGS. 1(c) and 1(d) are graphical representations of circularly polarized waves.

An antenna with linear polarization radiates only one plane that contains the line defined by the direction of wave propagation. An antenna with circular polarization, however, radiates in a circular motion in the plane of polarization at the speed of one revolution per radio wave period. In contrast to a horizontally or vertically polarized antenna, where propagation is strictly in one direction, as shown in FIG. 1(a) (horizontal polarization) and in FIG. 1(b) (vertical polarization), a circularly polarized antenna radiates energy in both horizontal and vertical planes as well as in all planes in between. FIGS. 1(a)-1(d) illustrate the differences between linear and circular polarizations. The wave propagation illustrated in FIGS. 1(c)-1(d) is of a Right-Hand-Circular (RHC) type.

Furthermore, the rotation sense of the radio makes the difference between two classes of circularly polarized antennas, namely, Right-Hand-Circular (RHC) and Left-Hand-Circular (LHC) type (counter clockwise direction). For good results and to avoid any dB loss (that could exceed 10 dB), circularly polarized antennas at both the transmission node and the reception node must have the same sense of polarization (i.e., both of RHC type or both of LHC type).

In the event that the radio wave strikes a smooth reflective surface, the wave may incur a 180-degree phase shift, creating what is known as a "mirror image reflection." In this case, circular polarization can be advantageous because the reflected wave from a circularly polarized antenna would have a different sense than the direct wave and, thus, fading originating from these types of reflections is minimized by using circular polarization.

Figure 2:
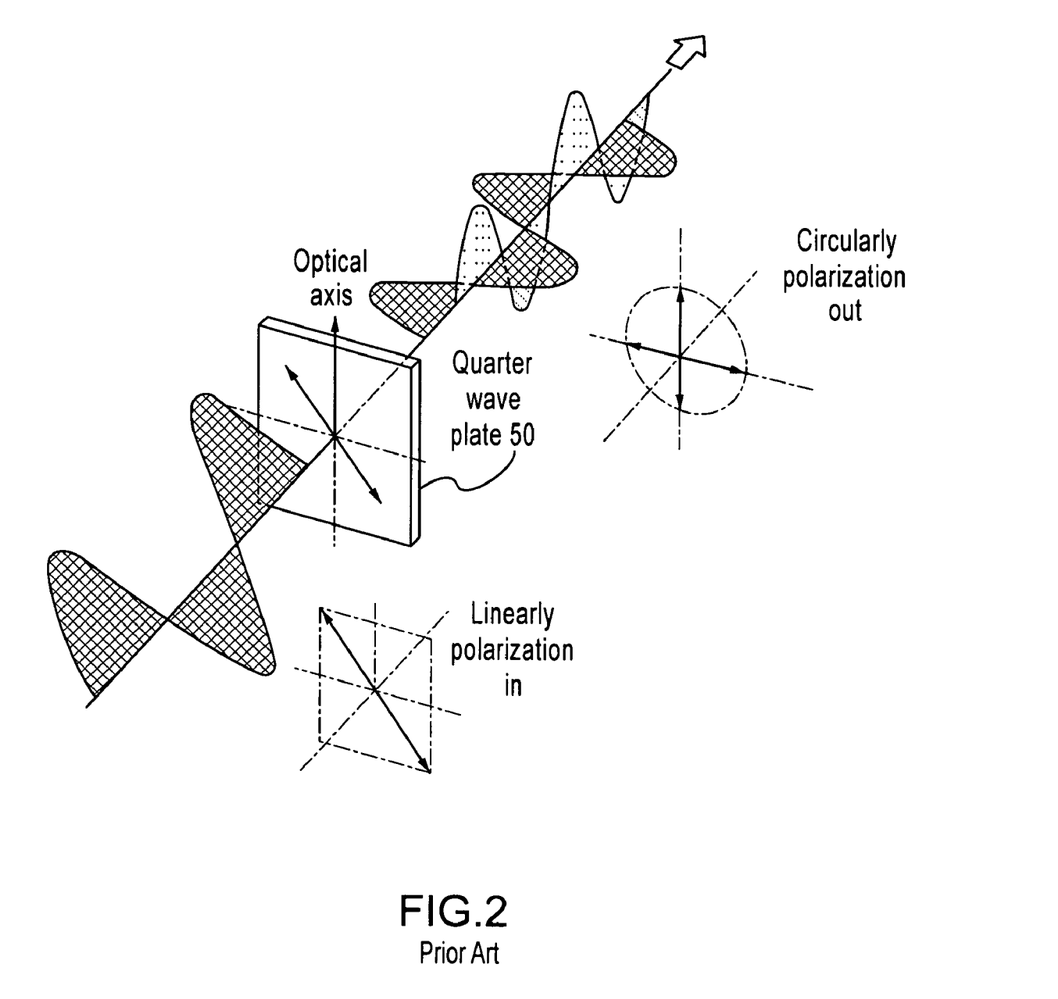
FIG. 2 is a graphical representation of how a circularly polarized wave is generated from a linearly-polarized wave.

Linear antennas are typically easier to produce than circularly polarized antennas. FIG. 2 shows a prior art example of producing circularly polarized waves out of linearly polarized waves using a quarterwave plate 50. Most systems today use either linear polarized (LP) to linear polarized (LP), or circular polarized (CP) to circular polarized (CP) to minimize polarization mismatch losses and depolarization. In some other situations when having better fading statistics is more important, mixing CP with LP could be a better alternative than using the same polarization at both ends of the transmission. However, such a mix comes at the expense of 3 dB loss in antenna gain.

SUMMARY OF THE INVENTION

The present invention is a wireless roving sensor, which includes a central access point and a plurality of slave nodes arranged in a star network in which the central access point wirelessly exchanges data with the slave nodes in a bi-directional fashion.

At least one of the antenna at the central access point and the antenna of each of the slave nodes is circularly polarized. One arrangement may be that the antenna of the central access point is circularly polarized and the antenna at each of the slave nodes is linearly polarized.

The central access point and the plurality of slave nodes may be mounted in an aircraft.

The linearly polarized antenna which may be used in each of the slave nodes may be one of a dipole antenna or a patch antenna.

BRIEF DESCRIPTION OF THE DRAWINGS

FIGS. 7(a)-7(b) are graphs of CDF distributions at a 15 foot distance within the aircraft, where FIG. 7(a) represents the results of trial number #1 in Table 1 and FIG. 7(b) represents the results of trial number #2 in Table 1.

FIGS. 8(a)-8(b) are graphs of CDF distributions at a 40 foot distance within the aircraft, where FIG. 8(a) represents the results of trial number #3 in Table 1 and FIG. 8(b) represents the results of trial number #4 in Table 1.

FIGS. 9(a)-9(c) are graphs comparing performances of linear polarization and circular polarization, where FIG. 9(a) shows data samples vs. attenuation; FIG. 9(b) shows data samples vs. RSSI; and FIG. 9(c) shows data samples vs. data rate.

FIGS. 10(a)-10(c) are graphs comparing WS performance with linearly and circularly polarized antenna at location #4 (40-foot distance), where FIG. 10(a) shows data sample vs. attenuation; FIG. 10(b) shows data sample vs. RSSI; and FIG. 10(c) shows data samples vs. data rate.

DETAILED DESCRIPTION OF EXEMPLARY EMBODIMENTS

Exemplary embodiments of the invention will now be described with reference to the drawings.

Figure 3:
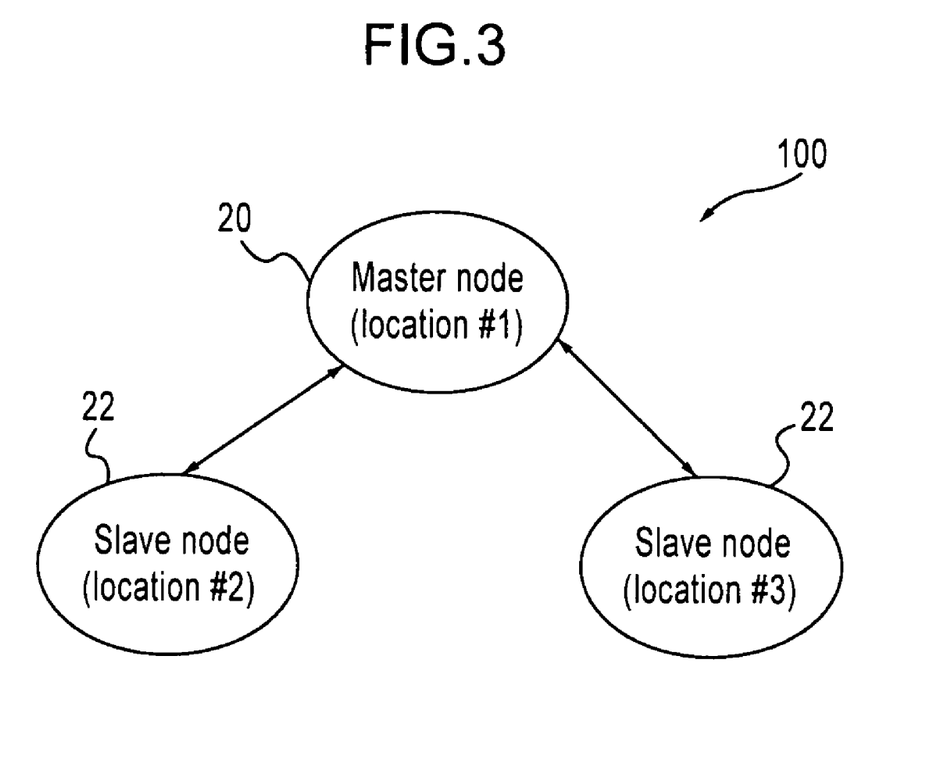
FIG. 3 is a block diagram of a Wireless Sensor (WS) showing the star-network.

The Wireless Sensor (WS) 100 shown in FIG. 3 is composed of a master node 20 (i.e., Access Point) and a plurality of slave nodes 22 structured in a star network, where the Access Point (AP) exchanges data wirelessly with the slave nodes 22. The Access Point (AP) is connected to a computer via an RS422 port (not shown) for software upload and data logging.

Each WS node 20, 22 is a Fully Functional Device (FFD) that can receive and transmit data. Thus, each FFD can play either the role of the Access Point or the role of a slave node 22. The "mobile" slave node 22 placed at various locations of the aircraft transmits data to the master node 20 in a format useful for acknowledgment and storage.

Figure 4:
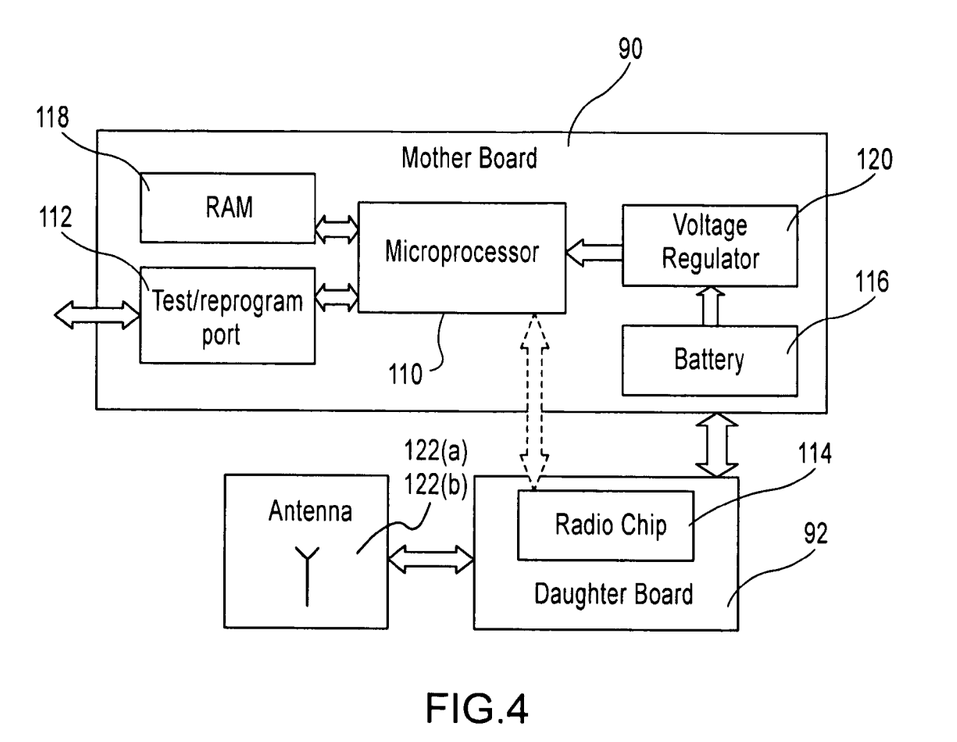
FIG. 4 is a block diagram of an WS unit.

An FFD of the Wireless Sensor (WS) 100 consists of a mother board 90 and a daughter board 92 as shown in FIG. 4.

The WS utilizes a microprocessor 110, a test/reprogramming port 112, a radio chip 114, a battery 116 for self power supply, a Random Access Memory (RAM) 118, voltage regulator 120, and antenna 122(a) or antenna 122(b).

The master node 20 can transmit/receive data wirelessly to/from any one of the other slave nodes 22. The microprocessor 110 controls the communications of the test/programming port 112, establishes correct gain setting for the Analog to Digital Converter (ADC) (not shown), samples the ADC at appropriate rates, and reads or writes data to the radio chip 114.

The WS 100 is tested for wireless link performance using various antenna polarization technologies in an aircraft environment. The selection of testing locations inside the aircraft is dictated by the actual Wireless System architecture such as a Health and Usage Management System (HUMS). The WS 100 is designed to replace any wired sensor for a quick and pointed data gathering operation at a specific location of the aircraft.

The first step of the testing procedure is to perform a sounding test to collect fading data via a network analyzer (not shown). The purpose of the step in the testing procedure is to assess the fading environment using well-established stochastic techniques. The second step of the testing procedure consists of wirelessly collecting data between the main location (i.e. the access point that is permanently placed under the pilot seat to simulate the HUMS main box) and other locations in the aircraft 124 where a HUMS sensor may reside. The goal of the second step is to measure the WS wireless data transmission performance in terms of signal strength and data rate.

Testing Locations Inside Aircraft

Figure 5:
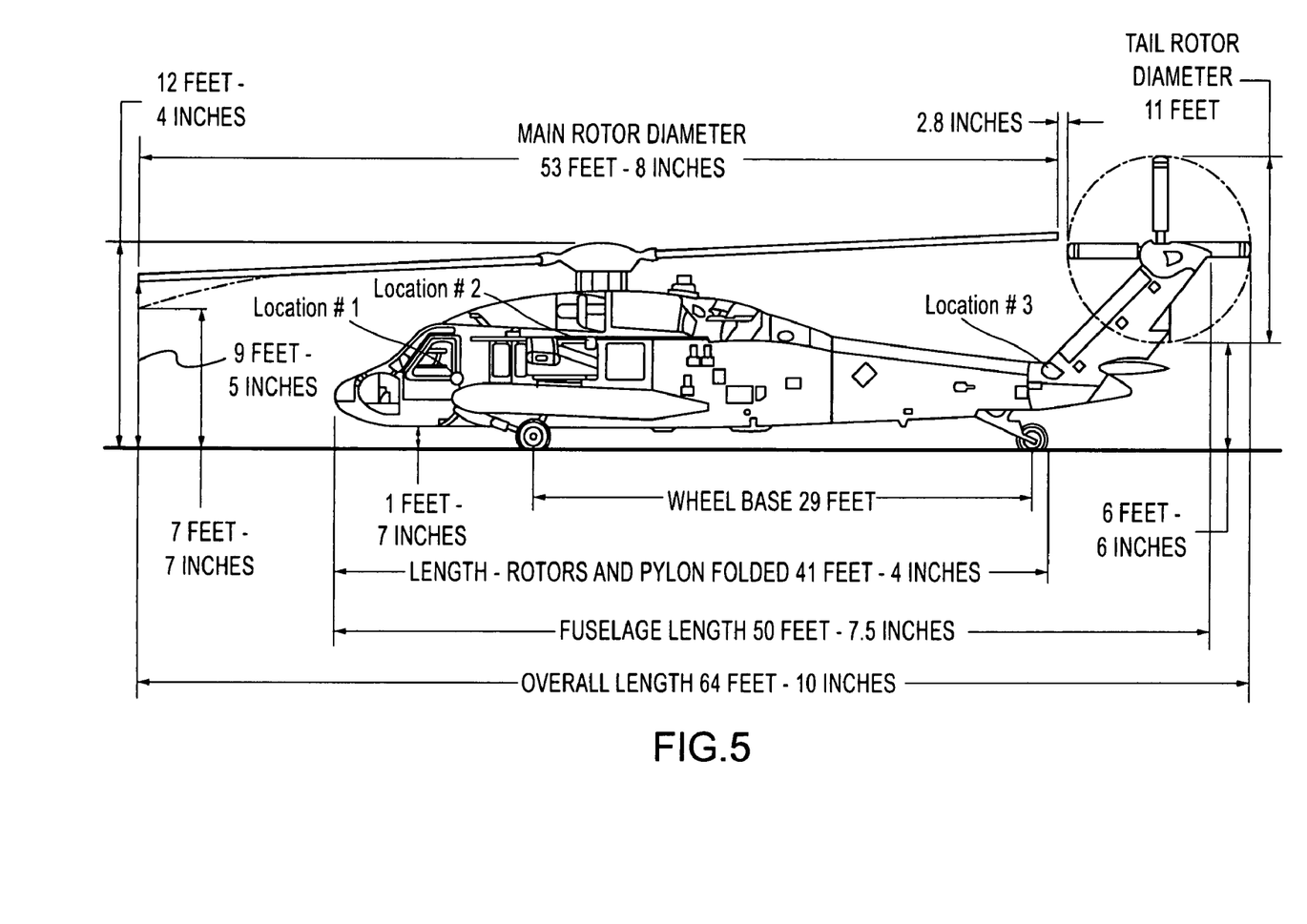
FIG. 5 is a plan view of an aircraft showing the various testing location of the WS inside the aircraft.

Three locations of the aircraft 124 numbered from #1 to #3, as shown in FIG. 5, are used to collect data and to compare propagation characteristics.

All data collected aboard the hosting aircraft 124 is carried out using 802.11g protocol which is based on a OFDM (orthogonal frequency division multiplexing) scheme with data rates varying from 6 to 54 Mbs.

To put in perspective the advantages of circularly polarized antennas the inventors compared them against typical linearly polarized antennas. For the purpose of this invention, the inventors tested two types of antennas in this field deployment: a dipole antenna with linear polarization and a commercially available Cushcraft® S2408PC antenna with a circular polarization. Everything else being equal (e.g. attenuation scheme), data collected using these two types of antennas should provide a better understanding of the antenna polarization effect on the WS performance.

Table 1 provides a brief description of each collected data set (i.e. trial number).

TABLE 1

| Trial Number | OB Antenna Location | OB Antenna | WS Antenna Location | WS Antenna |
|---|---|---|---|---|
| 1 | Rear of Pilot Seats (Location #1) | Dipole (Linear Polarization) | Crew Cabin Ceiling (Location #2) | Linear Polarization |
| 2 | Rear of Pilot Seats (Location #1) | Patch (Circular Polarization) | Crew Cabin Ceiling (Location #2) | Linear Polarization |
| 3 | Rear of Pilot Seats (Location #1) | Dipole (Linear Polarization) | Intermediary Gear Box-IGB (Location #3) | Linear Polarization |
| 4 | Rear of Pilot Seats (Location #1) | Patch (Circular Polarization) | Intermediary Gear Box-IGB (Location #3) | Linear Polarization |

The test setup consists of a simulated Access Point (AP), and a WS unit arranged somewhere in the aircraft 124. Data link speed and signal strength were evaluated for several combinations of WS unit location and AP antenna location. The AP antenna location was fixed for all trials with the antenna type and polarization being the variable. Additionally, in all cases the WS unit utilized a 3 dBi linear polarized patch antenna with antenna location being the trial variable.

Antenna Performance

A valuable tool for data quality measurement is the frequency fading profile of the WS unit at the various locations of interest as deployed with the two types of polarized antennas. A statistical analysis is used to characterize the fading profile of the radio signal at such locations and assess the performance of the antenna technology under test at such wireless channel.

Figure 6:
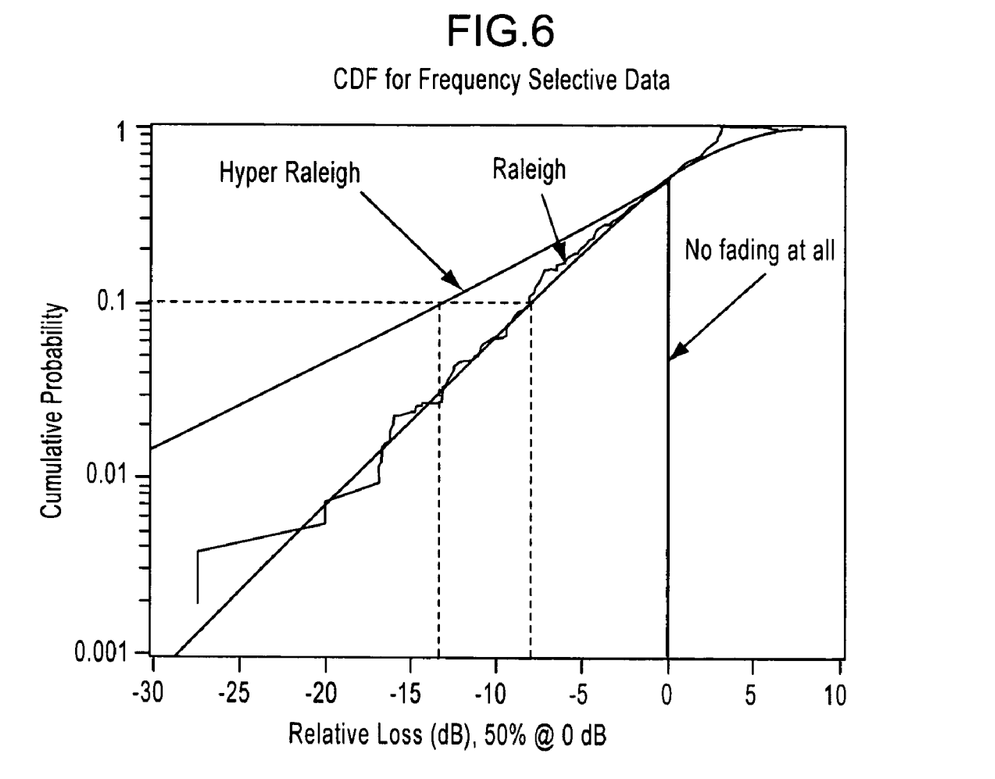
FIG. 6 is a graph showing an example of a CDF distribution of fading data collected in location #4 in the aircraft.

The resulting radio signal received by a WS unit in a multipath environment is a summation of the multipath components. In an environment with a large number of components, such as the case of an aircraft 124, where each of those components is of random amplitude and phase, the resulting radio signal is a complex envelope where the real and imaginary components tend to be of Gaussian distributions (by virtue of the central limit theorem). As such, the magnitude of the envelope in such environment is of Rayleigh-type distribution and the phase component has a uniform type distribution. In cases where there exists a strong line of sight (LOS) component, the fading statistics typically are of Ricean distribution (closer to a vertical line). In previous aircraft measurements, it was found that a case for the severe fading (i.e., hyper-Raleigh) could be made in some locations with excessive clutter and obstructing structure. FIG. 6 shows the Cumulative Distribution Functions (CDF) for a typical fading measurement taken at the aircraft under test at location #3 as shown in FIG. 5, at about 40 feet away from the receiving antenna. The Raleigh and hyper-Raleigh fading channels along with the measured data and the no fading case are presented. Those CDF functions are computed after a normalizing step with respect to the median fade value and thus allowing all curves to pass through a crossover point (0 dB—median, 50% cumulative probability). The median (rather than the average) selection for a normalization point makes logical sense because typically in wireless communications data can either be transmitted (right hand of the median point) or not transmitted (left hand of the median point) regardless of whether such a transmission (or the lack of it) is performed with a very high signal strength or otherwise.

For the no-fading case (constant signal strength over time and frequency), the curve is a unit step vertical line crossing at 0 dB. The more the fading curve goes further in the clockwise direction (with respect to the non fading vertical line) the more severe is the fading. The CDF curve is useful in setting link margins based on a given allowable outage probability. Using the appropriate fading model allows the proper allocation of transmission power to achieve certain availability requirement. For example, in FIG. 6, to achieve an outage probability of less than 0.1 (dotted lines), a system operating in a Rayleigh environment must be designed to have around 8 dB fade margin relative to the median value. However, if such environment was hyper-Raleigh, about 14 dB margin would have been required in the link budget instead. Such difference in link budgeting grows wider as more stringent outage probabilities are required. For instance, if the outage probability is set to 0.02 rather than 0.1, about 15 dB fade margin (relative to the median value) is needed for a Raleigh channel environment while more than 27 dB fading margin is needed in the case of a hyper-Raleigh channel.

Figure 7A:
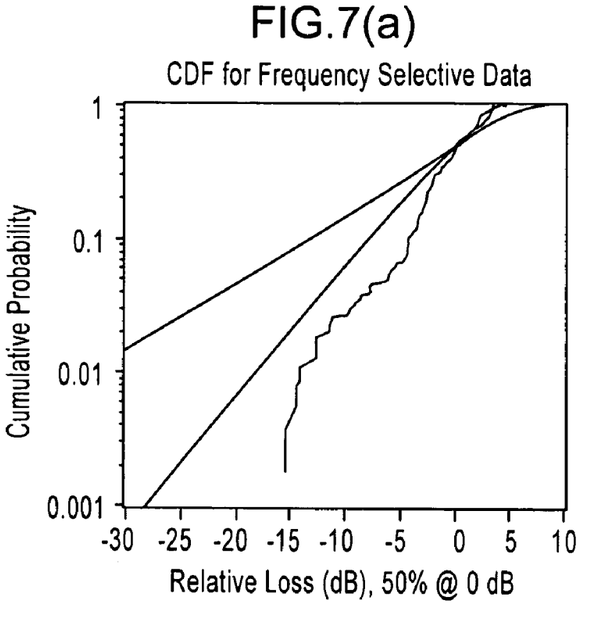
Figure 7B:
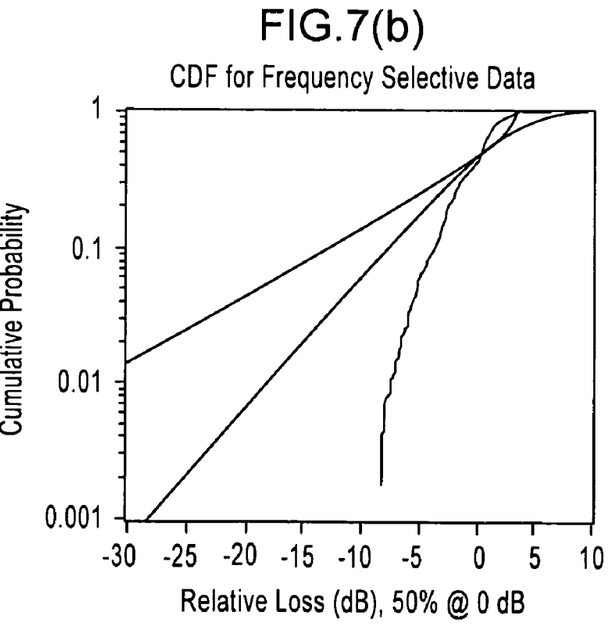
Figure 8A:
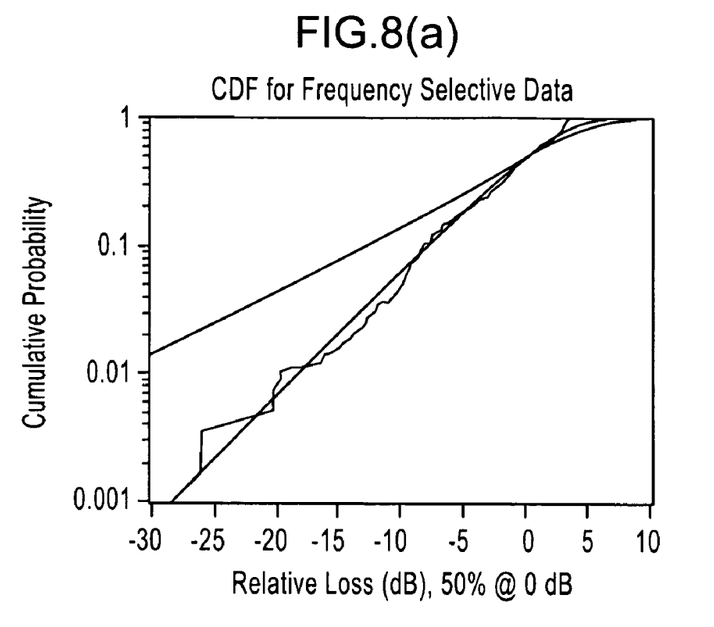
Figure 8B:
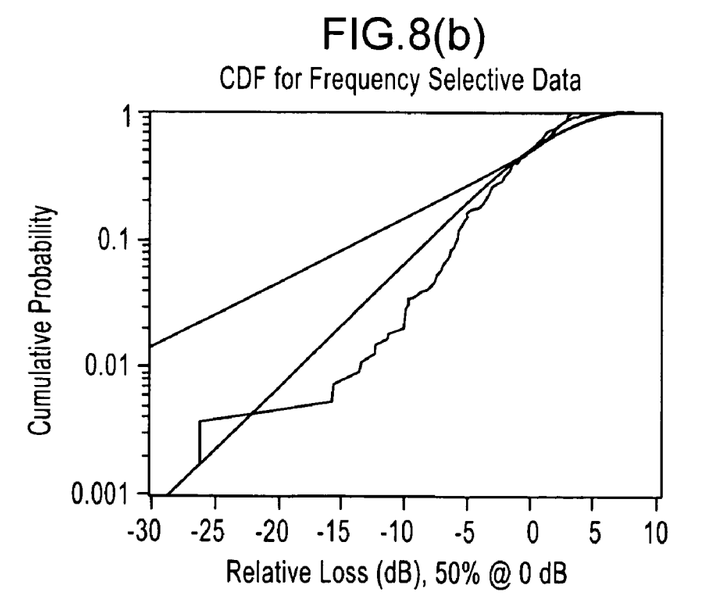

FIGS. 7(a), 7(b), 8(a), 8(b) show CDF distributions of various fading channels of the aircraft 124 under test depending on the measurement variables including location as well as antenna type. FIG. 7(a) shows CDF distributions (for Trial #1 in Table 1) at a 15-foot distance between a AP linear polarized antenna at the pilot seats (location #1) and the WS linear polarized antenna at the rear of the crew cabin ceiling (location #2). FIG. 7(b) shows CDF distributions (for Trial #2 in Table 1) at a 15-foot distance between a AP circular polarized antenna at the pilot seats (location #1) and the WS (linear polarized antenna at the crew cabin ceiling (location #2). The curve in FIG. 7(b) shows a smaller dB loss then the case in FIG. 7(a). FIG. 8(a) shows CDF distributions (for Trial #3 in Table 1) at a 40-foot distance between the AP linear polarized antenna at the pilot seats (location #1) and the WS linear polarized antenna at the Intermediary Gear Box-IGB (location #3). FIG. 8(b) shows CDF distributions (for Trial #4 in Table 1) at a 15-foot distance between a AP circular polarized antenna at the pilot seats (location #1) and the WS linear polarized antenna at the Intermediary Gear Box-IGB (location #3). The curve in FIG. 8(b) shows a smaller dB loss then the curve in FIG. 8(a). The benefits of using circular polarization, as compared to linear polarization, are clear as shown in both cases regardless of whether the wireless link is about 15-foot or 40-foot long. This advantage brought by circular polarization is translated in dB gain, as will be shown below. For a given data rate, any dB gain can be translated directly into an extension of the life of the battery 116 that powers the wireless WS unit.

Another measure of the antenna performance (keeping everything else constant) is the Received Signal Strength Indicator (RSSI) and the associated data rate by which data is transmitted wirelessly. These two indicators (i.e. RSSI and data rate) are generated by the WS system 100 at the previously indicated locations of FIG. 5 with the antenna 122a, 122b of the Access Point always stationed at the rear of the pilot seat (i.e., location #1).

Figure 9A:
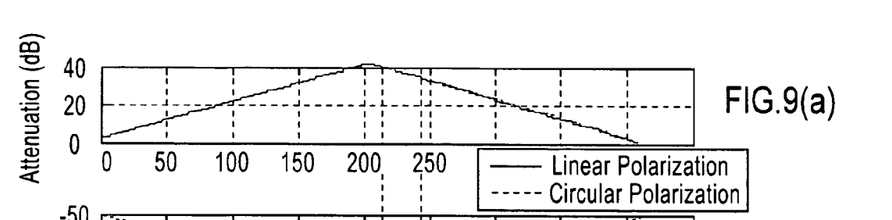
Figure 9B:
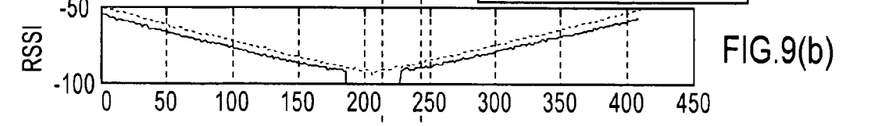
Figure 9C:
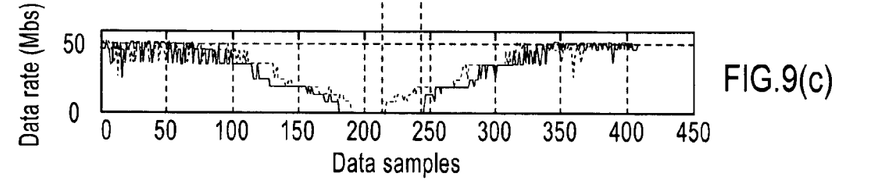
Figure 10A:
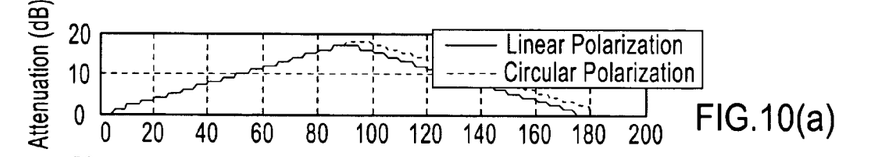
Figure 10B:
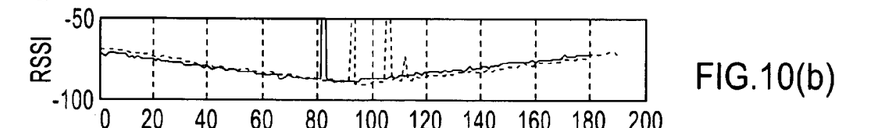
Figure 10C:
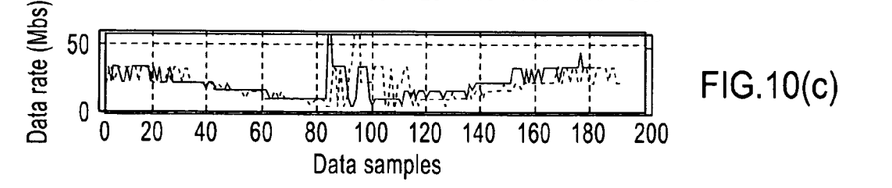

FIGS. 9(a), 9(b) and 9(c) show the performance of the system using an antenna 122a of linear polarization and antenna 122b of a circular polarization both located at location #2, which is about 15 feet away from the Access Point, where FIG. 9(a) shows the attenuation level (in dB), FIG. 9(b) shows the RSSI, and FIG. 9(c) shows the data rate. In this particular example the system performance using both types of antennas 122a, 122b is obtained using the same attenuation profile, same cable lengths, and same AP antenna location making the comparison uniquely in terms of antenna polarization. As can be seen, the antenna 122b of circular polarization performed better than the linear antenna 122a as the RSSI and data rate subplots show. For instance, there is almost 6 dB power gain when using a circularly polarized antenna 122b (compared to the linearly polarized antenna 122a) to recover after losing the signal. FIGS. 10(a), 10(b) and 10(c) respectively show the attenuation, the RSSI and the data rate at location #3 about 40 feet away from the access point. Here, the attenuation profile was not the same for both types of antennas 122a, 122b because the objective of this experiment was to decrease the power attenuation to the point of breaking the wireless connection. As can be seen in FIG. 10(a) the dynamic range of the WS using a circularly polarized antenna 122b is greater than that of a linearly polarized antenna 122a, which is another indication of the advantage of using a circularly polarized antenna 122b.

Various modifications will become apparent to those of ordinary skill in the art after receiving the teachings of the present disclosure without departing from the scope of the present invention.

The invention claimed is:

1. A wireless sensor system, comprising:
   a central access point including a first antenna; and
   a plurality of slave nodes each including a second antenna arranged in a star network in which the central access point wirelessly exchanges data with the slave nodes in a bi-directional manner,
   wherein at least one of said first antenna and said second antenna is circularly polarized, and wherein the central access point and the plurality of slave nodes are mounted in an aircraft.

2. The wireless sensor system as recited in claim 1, wherein said first antenna is circularly polarized and said second antenna is linearly polarized.

3. The wireless sensor system as recited in claim 1, wherein the other one of said first antenna and said second antenna is linearly polarized, and a physical mounting orientation of the central access point and each of the plurality of slave nodes on the aircraft is without regard to matching the linear polarization of the other one of said first antenna and said second antenna.

4. A method of wirelessly bi-directionally exchanging data between a central access point including a first antenna and any of a plurality of slave nodes each including a second antenna, all arranged in a star network, comprising the step of transmitting circularly polarized electromagnetic waves between the central access point and any of the plurality of slave nodes, wherein the central access point and the plurality of slave nodes are mounted in an aircraft.

5. The method of claim 4, wherein the first antenna is circularly polarized and the second antenna is linearly polarized.

6. The method of claim 4, wherein at least one of said first antenna and said second antenna is circularly polarized and the other one of said first antenna and said second antenna is linearly polarized, and a physical mounting orientation of the central access point and each of the plurality of slave nodes on the aircraft is without regard to matching the linear polarization of the other one of said first antenna and said second antenna.

* * * * *